Sept. 19, 1961 W. A. SCHAICH 3,000,050
METHOD AND APPARATUS FOR FORMING HOLLOW PLASTIC ARTICLES
Filed Nov. 4, 1958 6 Sheets-Sheet 4
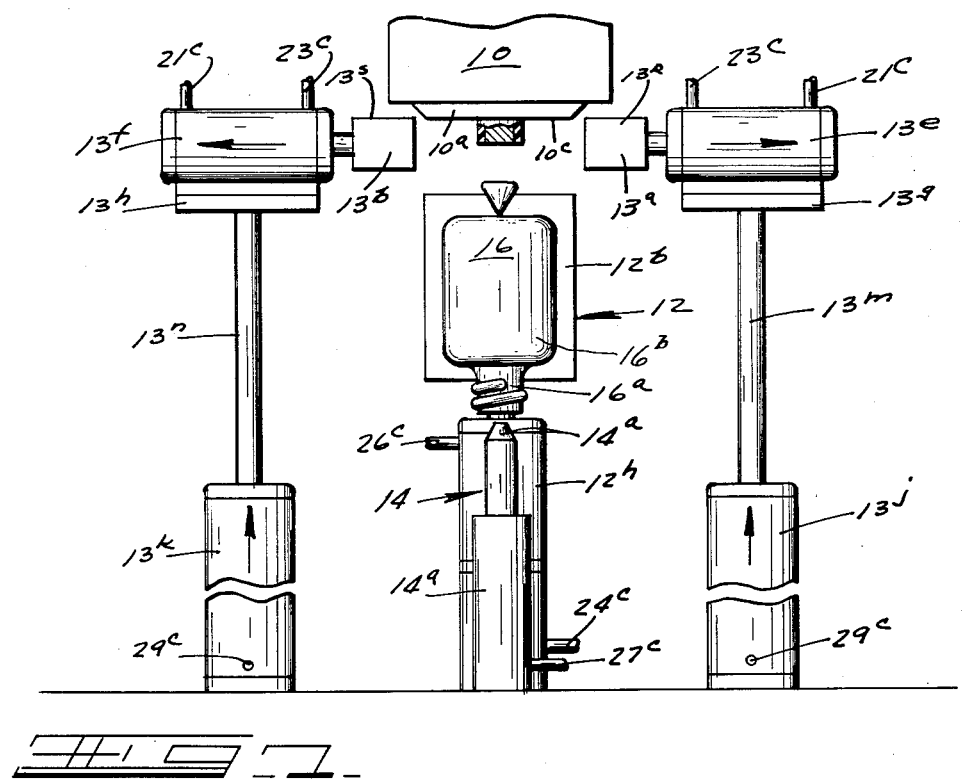
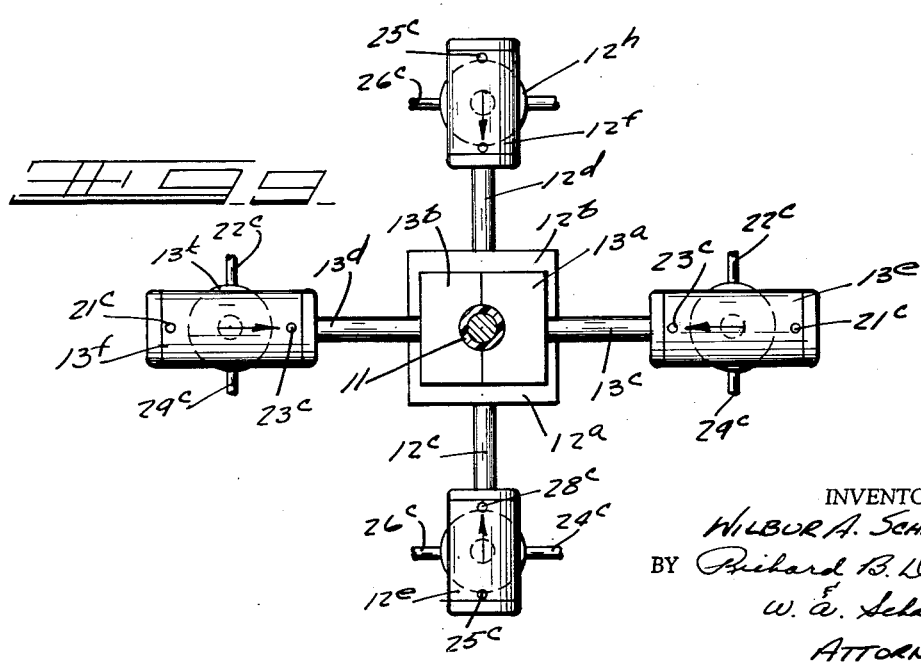
INVENTOR.
WILBUR A. SCHAICH
BY Richard B. Dence
W. A. Schaich
ATTORNEYS

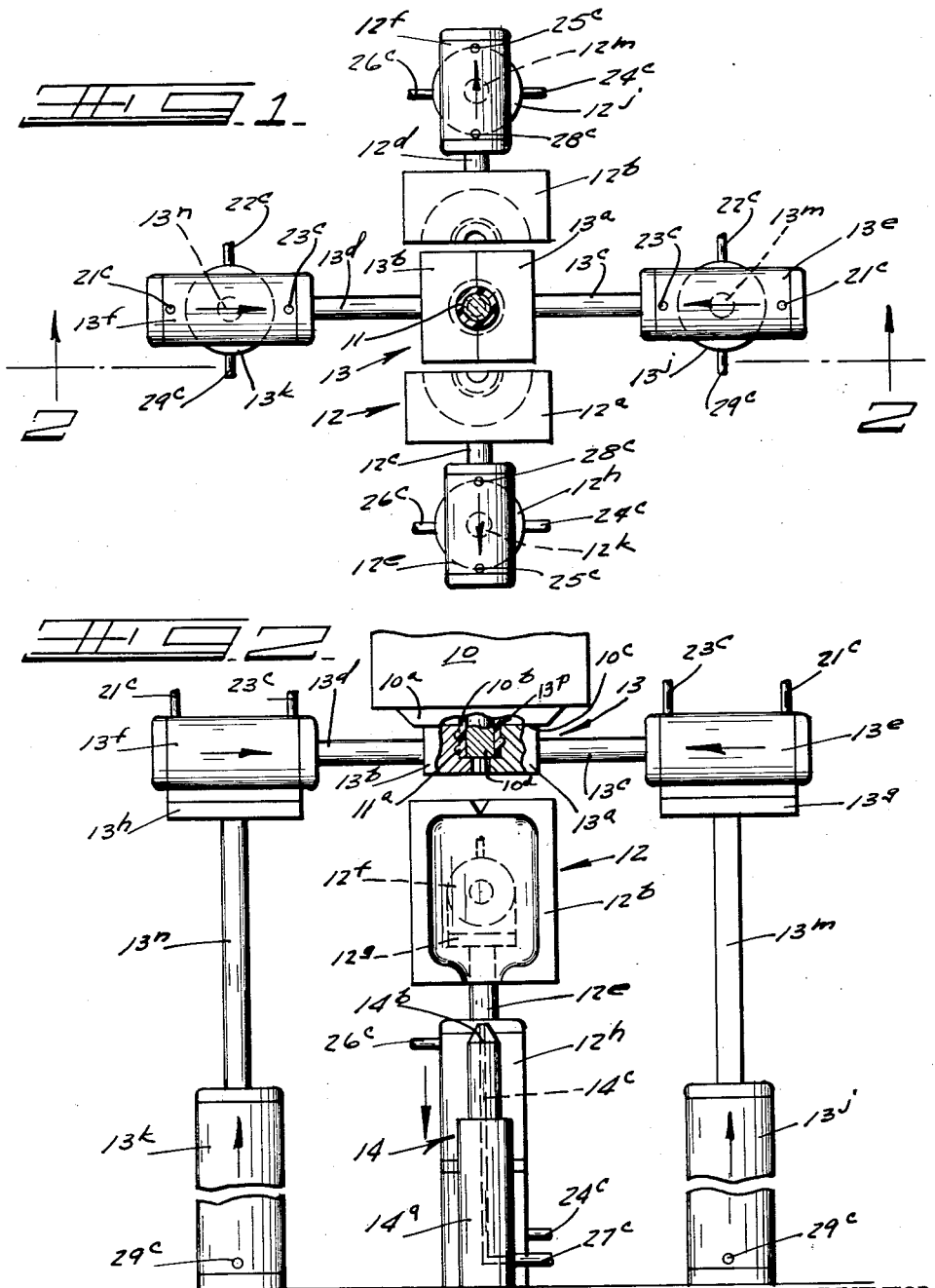

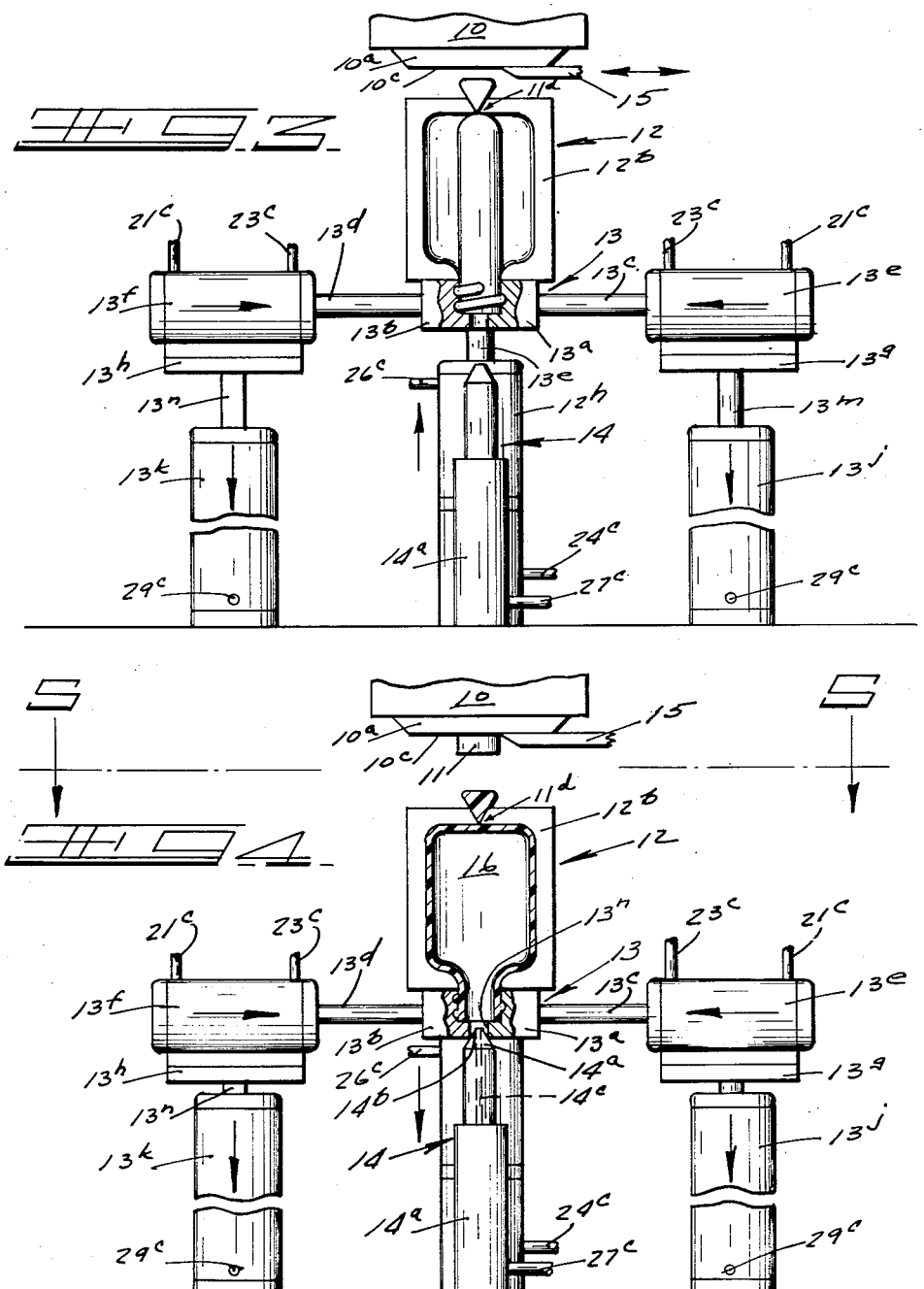

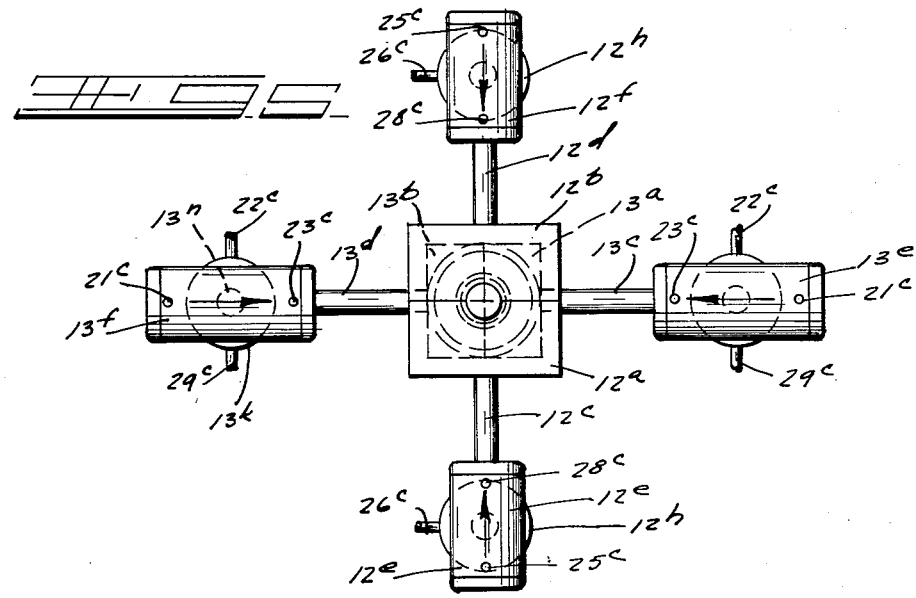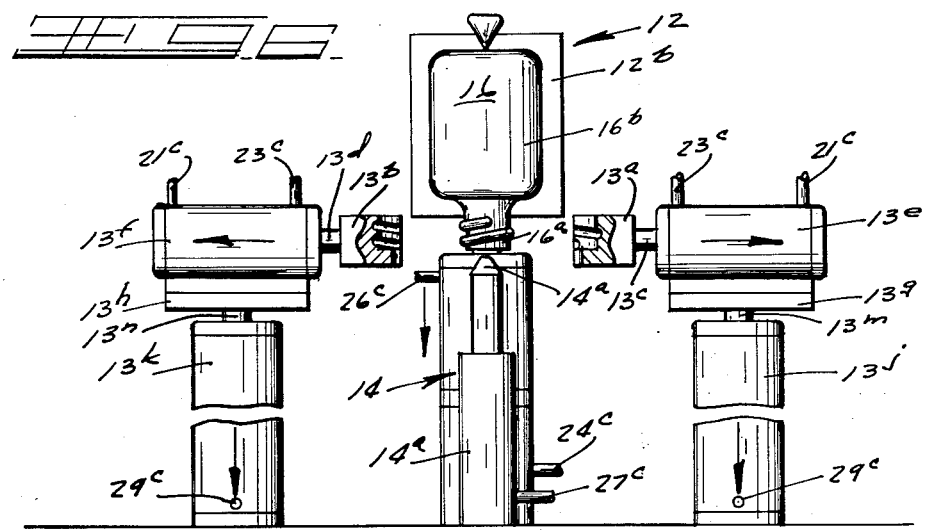

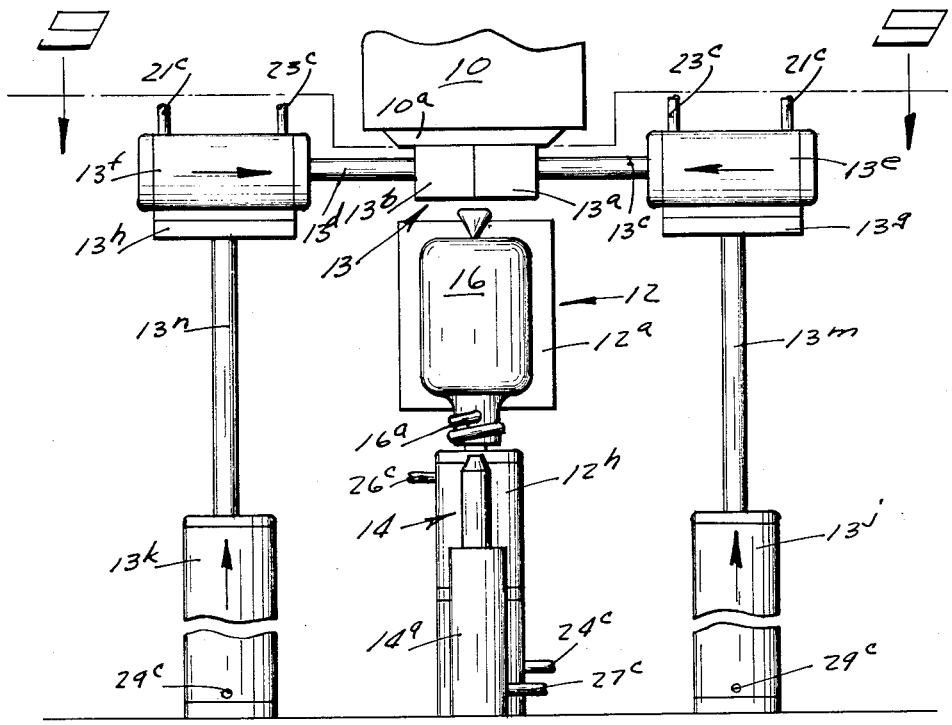

Sept. 19, 1961            W. A. SCHAICH            3,000,050
METHOD AND APPARATUS FOR FORMING HOLLOW PLASTIC ARTICLES
Filed Nov. 4, 1958            6 Sheets-Sheet 6
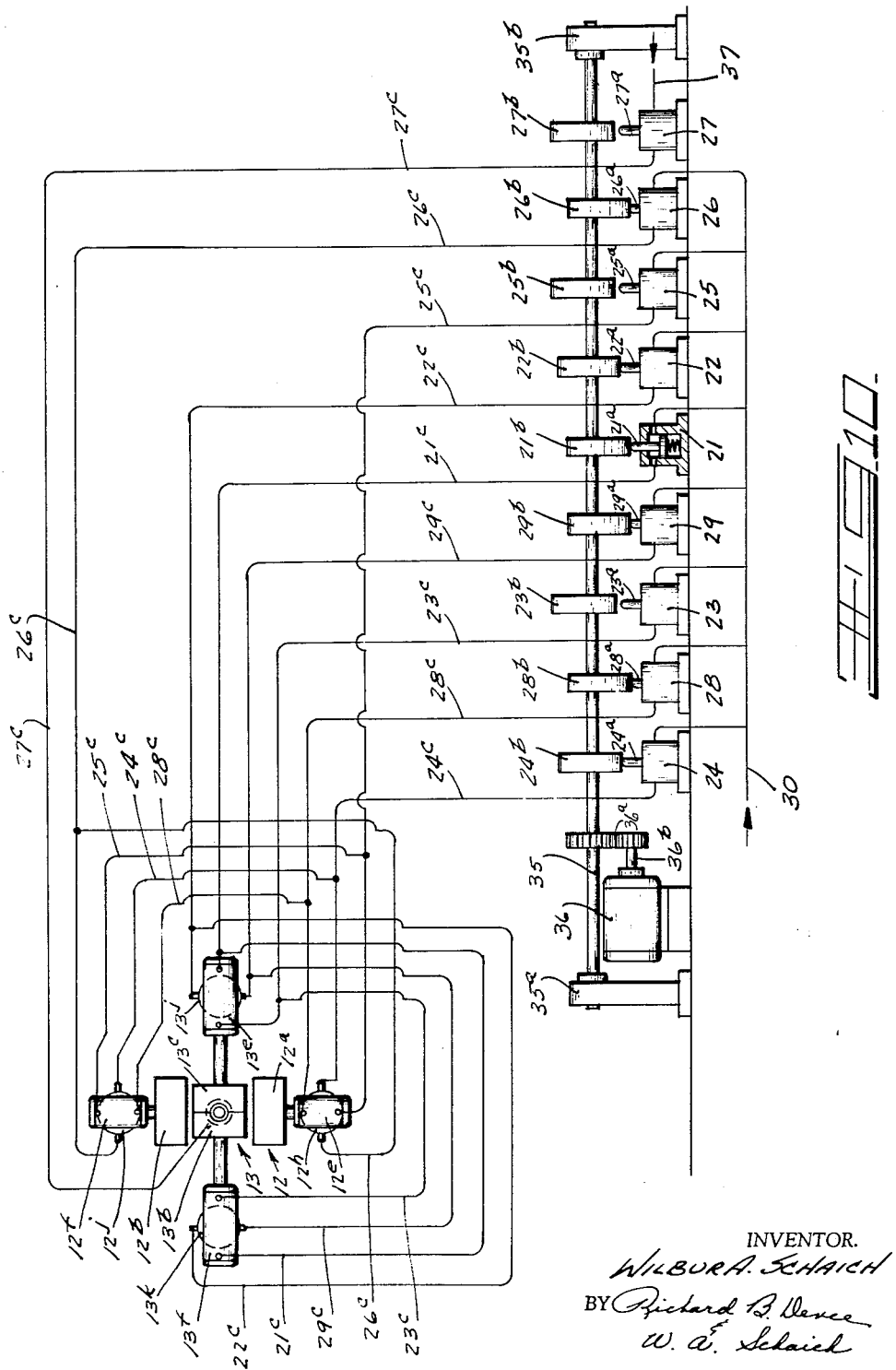
INVENTOR.
WILBUR A. SCHAICH
BY Richard B. Devee
W. A. Schaich
ATTORNEYS

United States Patent Office 3,000,050
Patented Sept. 19, 1961

3,000,050
METHOD AND APPARATUS FOR FORMING HOLLOW PLASTIC ARTICLES
Wilbur A. Schaich, Maumee, Ohio, assignor to Owens-Illinois Glass Company, a corporation of Ohio
Filed Nov. 4, 1958, Ser. No. 771,855
19 Claims. (Cl. 18—5)

The present invention relates in general to an improved method and apparatus for forming hollow plastic articles and, in more particularity, the accompanying drawings and description set forth the invention in its preferred embodiment in relation to a method and apparatus for molding hollow plastic bottles, or other like containers and hollow items, from a tubular formation of softened moldable plastic material.

Heretofore, it has been common practice to mold hollow plastic containers and other similar and related items by a method which briefly comprises enclosing a length of tubular heat-softened plastic material within the confines of a hollow cavity-type mold and forcing the plastic to conform to the internal configuration of the mold. Ordinarily, the desired shape of the body portion of the article is imparted to the confined tubular plastic by forcing a pressurized fluid, such as air or the like, into the plastic tube and expanding same into conformity with the shape of the walls of the mold cavity. Either at the same time, or shortly before, or after, the shaping of the body portion, the neck portion of the article is usually also molded either in the same manner, or by compression molding, or injection molding, or a combination thereof.

In accordance with the already known procedures and apparatus briefly described above, it further has been the practice to extrude the hollow column or tube of plastic material from which the desired item is to be molded either continuously or intermittently. In both the continuous and intermittent types of extrusion, however, certain inefficiencies and operational limitations occur which it is extremely desirable to eliminate, since the production of molded plastic items on a commercial basis is highly competitive.

In operations involving the use of intermittently operable extrusion devices, it has been common procedure to station the molding units directly beneath and in close proximity to thte plastic discharge end, or more conventionally the orifice, of the extruder, and to mold the hollow extruded column, or tube, of plastic to the desired shape without substantially altering the initial proximate location of the molding units beneath the extruder orifice during the entirety of the molding operation. After a desired length of the heat-softened plastic tube has been delivered from the extruder orifice, such length being determined by the size and shape of the item to be molded, further delivery of the tube is interrupted until the molding units have completed one article and are emptied to receive the next succeeding length of plastic. Ordinarily, this means that further delivery of plastic from the extruder may not be commenced until the preceding charge or length of plastic has been completely molded and removed from the molding units. The sequence of the foregoing steps may vary somewhat, but irrespective of the sequence the extruder operates intermittently and each article must be completed before the next successive item can be molded and before another length of plastic tubing may be discharged from the extruder. During the pendency of each successive delivery, e.g. the time interval required to extrude the desired length of tubing, the empty molding units must obviously remain idle. Thus, the efficiency of the operation is less than that which could be achieved if successive lengths of tubing where immediately available after each successive molded item has been removed from the molding units.

In contrast with the intermittent-type extruder, the continuous-type of extruder constantly delivers a tubular formation and thereby promises a more efficient utilization of the molding units. With an extruder having a continuous discharge of plastic, the molding units ordinarily operate in such manner that they enclose a desired length of tubular plastic and move axially away from the extruder orifice at a rate of movement at least equal to the lineal rate at which the tubular formation is being extruded. Thus, the movement of the molding units away from the extruder orifice prevents the molding units from interfering with, or obstructing, the oncoming plastic constantly issuing from the extruder. During the advancement of the molding units away from the extruder orifice, or quickly thereafter, the molding operation is carried to completion and the molded item removed. At this stage of the operation the molding units may be moved toward the extruder orifice to immediately receive another length of tubing which will have already issued from the extruder. Consequently, the molding units needs not remain idle, since the next successive length of tubing is immediately available and the operative efficiency of the molding operation is thereby enhanced.

Even with methods and apparatus adapted for use with continuous-type extruders, however, it has been common practice to delay the actual molding of the tubular plastic until a length of material sufficient to form the entire item has been delivered from the extruder. More specifically, it has been the practice to continuously extrude the plastic, and, when a length of material sufficient to form the article has issued from the orifice of the extruder, to enclose the plastic and proceed to mold the entire article in substantially the same molding operation. However, the efficiency and speed of the molding operation, even with molding operations utilizing a continuous-type extruder, are governed principally by the rate at which the molding units may be utilized to mold successive plastic articles. Since the rate of extrusion of the plastic material from the extruder may be readily increased, it is apparent that the rate at which successive articles may be produced is primarily determined by the availability of the molding units to receive the extruded plastic. Further, the previous practice, in molding operations utilizing a continuous-type extruded, of molding the entire article prior to initiating the molding of the next successive article entails a substantial loss of time in the molding operation due to the inability to utilize the molding units at a faster rate of production.

Additionally, the molding of articles with continuous-type extruders has almost universally involved the use of blow-molding techniques for the shaping of the desired article. Obviously, the methods and apparatus heretofore employed are not compatible with molding techniques employing injection molding of the article, or certain portions thereof. Since the tubular plastic formation will have issued from the extruder orifice a substantial distance prior to enclosures thereof in the molding units, it is impossible to apply the necessary extrusion pressure to the plastic to accomplish injection molding of the neck portion of a plastic bottle, for example, without deformation of the remainder of the soft tubular length of material. Such a process therefore has certain objectionable limitations in the molding of plastic bottles and other similar items having a neck portion or other portion which is quite difficult to blow mold with any degree of accuracy and dimensional preciseness, and which is best formed by injection molding or compression-molding techniques. Another particular objectionable characteristic of articles, such as plastic bottles and other similar items, molded in this fashion is the formation of a substantial amount of surplus plastic material which is attached to the molded article and which must be severed or otherwise removed therefrom. The formation of such attached surplus plastic material and methods and apparatus for the removal thereof are fully described in my copending United States application, Serial No. 756,576, filed August 22, 1958, now abandoned.

In view of the above, the present invention has as one of its objectives the provision of an improved method and apparatus for forming hollow plastic articles in such manner that said method and apparatus are capable of utilization with either a continuous or intermittent type of plastic extruder.

Another object of this invention is to provide a method and apparatus for forming hollow plastic articles, or similar items, from a plastic tubular formation in a manner which eliminates the formation of a substantial amount of surplus plastic which, according to many prior art methods and apparatus, is ordinarily attached to the molded article.

Still another object of this invention is to provide a method and apparatus, of the general nature described above, for molding hollow plastic articles and similar items from extruded tubular plastic formations in a manner expediting the efficiency and production rates of the molding operation.

A further object of this invention is to provide a method and apparatus for forming a hollow plastic article characterized by forming a portion of the article by injection-molding procedures and by forming another portion of the article by blow-molding procedures.

A still further object of the present invention is to provide a method and apparatus for movement of separate molding units through intersecting paths of movement while the molding operations are in progress and without interfering with such operation.

A still further object of this invention is to provide a method and apparatus for use with either an intermittent or continuous-type plastic extrusion device whereby it is possible to injection mold or compression mold at least a portion of the extruded plastic to a predetermined shape.

A still further object of this invention is to provide a method and apparatus for forming hollow plastic articles characterized by the provision of separate molding units for molding different portions of the container and which are capable of separate relative movements so that the molding units may be separately moved around each other during the course of the molding operations to permit concurrent molding of successive articles.

Other objects and advantages will become apparent from the following detailed description, taken in conjunction with the annexed sheets of drawings on which, by way of example only, a preferred embodiment of the present invention is illustrated.

On the drawings:

FIG. 1 is a schematic plan view of the plastic molding apparatus in which the present invention is embodied.

FIG. 2 is a partly fragmentary elevational view of a section of the apparatus shown in FIG. 1, the section being taken along the plane 2—2 of the latter figure, and with the apparatus in its related position beneath the discharge orifice of a plastic extrusion device.

FIG. 3 is an elevational view of a section of the apparatus taken along the plane 2—2 in FIG. 1, and, as in the ensuing views, illustrates the apparatus during a different sequence of the molding operation.

FIG. 4 is likewise an elevational view of a section of the apparatus taken along the plane 2—2 in FIG. 1, but showing the apparatus during a still different sequence of the molding operation and with the plastic molded to the shape of the molding units.

FIG. 5 is a view taken along the plane 5—5 in FIG. 4, and further shows the relative positions of various parts of the apparatus during the sequence of the molding operation represented by FIG. 4.

FIG. 6 is another sectional view along the plane 2—2 of FIG. 1, but during a still different sequence of the molding operation and shows the molding units for a portion of the article in a retracted and open position and the molding units for another portion of the article in a closed position around the article.

FIG. 7 is a partly fragmentary elevational view of the apparatus near the completion of one cycle of the molding operation and with part of the apparatus in readiness for beginning the next successive molding cycle.

FIG. 8 is a view similar to FIG. 7, but showing the apparatus concurrently performing different molding operations on successive plastic articles.

FIG. 9 is a plan view of the apparatus taken along the plane 9—9 in FIG. 8.

controlled and timed movements to various parts of the
FIG. 10 is a schematic view of means for imparting apparatus.

Briefly, the present invention involves a novel method and apparatus for forming hollow plastic articles and comprises positioning a first partible mold adjacent to the discharge orifice of a plastic extruder and molding the plastic to form a part of the article desired. The mold is thereafter moved away from the extruder while additional plastic is being extruded so that there is produced a tube of plastic carried at one end by the mold and at the other by the extruder. The length of plastic is then enclosed within another, or second, mold, separated from the extruder and molded to complete the shaping of the remaining portion of the article. Then, while the second mold still remains closed around the shaped article, the first mold is parted and passed around the second mold to initiate a repetition of the molding cycle by forming a portion of the next successive article and carrying a new length of tubular material away from the extruder. Thereafter, the second mold is parted to remove the initial article and moved relatively around the first mold to enclose the new length of tubular material and complete the molding of the next article. Thus, while one article is being completed in one mold, the formation of another article is being carried out in the other mold.

In the diagrammatic views which have been chosen to illustrate a preferred embodiment of this invention, an extruder 10 is shown extruding a depending column of tubular plastic material 11 from the discharge orifice 10a of the extruder. Although extruder 10, in the ensuing description, will be described as being a continuously operable extruder, it will be apparent from the following disclosure that the invention is not restricted to association with this particular type of extruder, and may be utilized quite successfully, and with highly improved efficiency and production, with intermittently operable extruders as well. As the plastic is extruded it is enclosed and molded to the desired shape in hollow segmental, or sectional, molding units 12 and 13, which together define the configuration intended to be imparted to the finished plastic article.

In accordance with the present invention, the molding units 12 and 13 are constructed and arranged to pass around each other to perform separate and distinct molding operations on the extruded plastic 11. For example, a portion of the article, which for explanatory purposes only is represented as a plastic bottle 16 (FIGS. 6 and 7), may be molded by compression or injection molding techniques, whereas another portion of the same article may be molded by blow molding techniques. In the present instance, the neck portion of the bottle may be formed by compression or injection molding the plastic material 11 in neck mold 13, and the body portion of the bottle may be formed in body mold 12 by blow molding procedures.

Referring particularly to FIGS. 1 and 2, the extruder 10, which, for purposes of description only, is a continuously operable type extruder, extrudes a hollow tubular open-ended plastic formation 11 through a discharge orifice 10a in which there is an axially movable, mandrel-like element 10d in concentrically spaced relationship with the walls of the discharge orifice 10a to define therewith an annular discharge opening 10b; the tubular plastic 11 being discharged through the annular opening 10b at a temperature permitting subsequent molding of the plastic within molds 12 and 13. The mandrel-like element 10d is arranged to move axially into or out of the discharge orifice 10a at selected intervals, as shown by a comparison of FIGS. 2 and 3, and is actuated by a conventional hydraulic cylinder, or other suitable means, not illustrated.

As best illustrated in FIG. 2, hollow partible molds 12 and 13, which for descriptive purposes will hereinafter be referred to respectively as body mold 12 and neck mold 13, together cooperate to define the interior configuration of the object or article to be formed, and which in the present instance, for explanatory purposes only, define the shape of the conventional plastic bottle 16. The shape of the body portion 16b of bottle 16 is defined by the interior configuration of the partible body mold 12, and the threaded neck portion 16a of bottle 16 is defined by the interior configuration of the partible neck mold 13 in cooperation with the mandrel-like element 10d projecting from discharge orifice 10a. The neck mold 13 is of segmental construction and is comprised of mold half-sections 13a and 13b which are movable both laterally and in parallelism relative to the axis of the extruder orifice 10a. Likewise, mold 12 is comprised of mold half-sections 12a and 12b which are mounted for lateral and parallel movements relative to the axis of the discharge orifice 10a. The movements of the molds 12 and 13 relative to each other and relative to the extrusion of the tubular plastic 11 are coordinated in such manner that the mold 13 in cooperation with discharge pressure exerted by the extruder upon the plastic 11 forms the threaded neck portion 16a of the bottle 16 by injection molding techniques prior to the formation in mold 12 of the bottle body portion 16b by blow molding techniques.

The neck mold half-sections 13a and 13b are connected to opposed piston rods 13c and 13d, respectively, which in turn are actuated inward and outward, in timed sequence, as shown by comparison of FIGS. 2 and 6, by pistons 13e and 13f, respectively, which are mounted on the upper surface of suitable platforms, such as individual mounting blocks 13g and 13h. Upward and downward movements are imparted to the neck mold half-sections 13a and 13b, respectively, by pistons 13j and 13k which are mounted in fixed vertically operable position with piston rods 13m and 13n, respectively, carrying the mounting blocks 13g and 13h upon which the pistons 13e and 13f are mounted.

In similar manner, the operation of body mold half-sections 12a and 12b is effected by a group of pistons which impart lateral and parallel movements thereto. As illustrated in FIGS. 1 and 5, body mold sections 12a and 12b are connected to the ends of piston rods 12c and 12d, respectively, which form a part of pistons 12e and 12f. Pistons 12e and 12f are mounted on individual mounting blocks, such as 12g, carried by vertically operable piston rods 12k and 12m which form a part of pistons 12h and 12j, respectively. The relative arrangement of the pistons is such that the neck mold half-sections 13a and 13b and the body mold half-sections 12a and 12b are moved in paths which are disposed radially about the axis of the extruder orifice 10a at substantially 90° intervals and with the body mold half-sections 12a and 12b arranged opposite each other and the neck mold half-sections 13a and 13b similarly arranged opposite each other.

A blow head 14, positioned in vertically spaced axial alignment with the annular opening 10b in the extruder orifice 10a, emits fluid pressure to the interior of the tubular plastic formation when the latter is enclosed within the body mold sections 12a and 12b and forces the plastic to expand and conform to the interior configuration of the body mold sections. The blow head 14 preferably defines a conically or spherically shaped upper end 14a which fits snugly into the axial passage 13n (FIG. 4) in the bottom of the neck ring 11 and forms a wedge-fit, fluid-tight seal with the wall thereof as shown at 14b. An axial bore 14c in the blow head provides for passage of fluid pressure into the passage 13n to expand the plastic.

Means for severing desired lengths of the tubular plastic formation, as the latter issues from the extruder orifice 10a, is provided by a knife 15 or other suitable cutting element having a sharp cutting edge 15a. The knife is operated in such manner that it very quickly scrapes transversely across the bottom of the extruder orifice to sever a predetermined length of the plastic issuing therefrom. The knife 15 is preferably actuated by a fluid cylinder (not shown), or other suitable apparatus capable of effecting a very rapid severing movement so that the severed end of the residual oncoming tubular formation will remain open. To prevent interference with the severing of the plastic, the mandrel-like element 10d is momentarily retracted axially into the extruder 10 during the movement of the knife 15 across the discharge orifice 10a. A very sharp cutting edge on the cutting element or knife 15 together with a rapid cutting movement is preferable to insure that the oncoming end of the plastic is not closed by the severing action.

With the foregoing apparatus it is possible to achieve a sequence of operational movements which result in the formation of hollow plastic articles in a highly improved manner. For purposes of description only, and to provide a suitable point of beginning, the description of the operation of the apparatus for one molding cycle will start with the apparatus in the positions illustrated in FIGS. 1 and 2. As illustrated, the piston rods 13m and 13n are vertically extended by actuation of the pistons 13j and 13k and raise the body mold 13 to a position such that the upper faces of the neck mold half-sections 13a and 13b lie in a plane coinciding with the bottom face 10c of the extruder orifice 10a. The horizontally movable piston rods 13c and 13d are also in extended position urging the opposed neck mold sections 13a and 13b together in complementary mating engagement beneath and in axial abutting alignment with the annular opening 10b in the extruder orifice 10a, so that the mandrel-like element 10d extends into the neck mold 13 in concentrically spaced relationship and the tubular plastic formation 11, as it is extruded from the orifice 10a, fills the annular opening 13p defined between the mandrel-like element 10d and the interior surface of the neck mold 13. The pressure under which the tubular plastic formation is extruded may be quite substantial and, in certain instances, may be supplemented by additional pressure from an auxiliary piston or the like, and, as a result thereof, it is possible to mold precise features on the neck portion of the bottle, such as the fastening threads 11a, or other desired interior and exterior shapes which may be difficult or practically impossible to form with other types of molding techniques.

The body mold half-sections 12a and 12b, which together define the configuration for the body portion of the bottle, are respectively separated by the retracted piston rods 12c and 12d, so that they are withdrawn from the path of downward movement of the closed neck mold 13. Thereafter, the body mold half-sections 12a and 12b are raised by extending piston rods 12k and 12m to a predetermined elevated position.

After a sufficient amount of the tubular plastic material 11 has been extruded to completely fill the closed neck mold 13, and to conform to the interior configuration thereof, the neck mold 13 is lowered at substantially the same lineal rate as that at which the tubular plastic formation is being extruded from the extruder orifice 10a. Hence, the tubular plastic formation 11 is guided axially downward, e.g. in the direction of extrusion, by the neck mold 13 while it is being extruded. When a predetermined length of the tubular plastic formation 11 sufficient for the formation of a bottle or other article having the desired shape and thickness has been extruded in this manner, the body mold 12 is closed about the tubular plastic formation (FIG. 3). The closing of the mold 12 is accomplished by extending piston rods 12e and 12d and bringing the body mold sections 12a and 12b together around the tubular plastic between the neck mold 13 and the extruder orifice 10a. Also, the bottom face of the body mold 12 and the upper face of the neck mold 13 are arranged so that they will abut in axial alignment when the body mold 12 is so closed. Further, as a result of closing the body mold sections 12a and 12b, the tubular plastic 11 is pinched together, as at 11d, in such manner as to completely close the trailing end of the enclosed plastic formation. Concurrent with the closing of the body mold half-sections 12a and 12b, or immediately thereafter, the enclosed length of plastic is severed, as illustrated in FIG. 3, by a quick transverse scraping movement of the knife 15, or other suitable cutting implement, across the face of the orifice 10a in such a manner as to leave the severed end of the oncoming extruded plastic open.

Concurrent with, or immediately following the severing operation, molds 12 and 13 are lowered while in abutment to a blowing position, as shown in FIG. 4, wherein the conically or spherically shaped end portion 14a of the blow head 14 enters the axial passage 13n defined in the neck mold 13, and by virtue of its larger size and conical or spherical configuration wedges against the wall of the passage 13n to form a fluid-tight seal therewith, as at 14b. With the use of a continuous-type extruder the downward movement of the molds 12 and 13 into blowing position should preferably be at a rate substantially greater than the rate of advancement of the plastic from the extruder orifice 10a to avoid possible contact with subsequently extruded plastic. The enclosed tubular formation is then expanded to the configuration of body mold 12, by introducing fluid pressure such as air, or the like, into the passage 13n in the neck mold 13 through the axial bore 14c in the blow head 14; the fluid pressure being maintained a sufficient length of time to ensure that the expanded plastic will cool sufficiently to attain a self-supporting rigidity.

Once the plastic in the neck mold 13 has become self-supporting, the neck mold half-sections 13a and 13b are separated by retracting the piston rods 13c and 13d, as illustrated in FIG. 6, and moved up around the closed body mold half-sections 12a and 12b to raised separated positions (FIG. 7) in which the upper faces 13r and 13s, respectively, of the neck mold half-sections 13a and 13b are situated in a plane coinciding with the bottom surface 10c of the extruder orifice 10a.

The process of this invention can achieve optimum efficiency when the plastic material within the neck mold 13 is chilled to self-supporting consistency concurrently with the completion of the blowing of the plastic tube to conform to the body mold 12, so that the neck mold may be removed from the plastic article at that instant. Ordinarily, the natural heat losses occurring in the neck mold is sufficient to effect such cooling; but, for articles having large neck sections, it may be necessary to accelerate the heat losses, such as for example, by incorporating conventional fluid cooling channels in the neck mold and circulating coolant therethrough. Meanwhile, the mold half-sections 12a and 12b may retain the molded plastic article, or bottle 16, in a spaced position over the axial bore 14c in the blow head 14. Thus, a coolant may be directed into the interior of the bottle 16 through the axial bore 14c of the blow head 14 even after the neck mold half-sections 13a and 13b are removed from the formed article. Extremely effective distribution and circulation of the coolant issuing from the blow head 14 may be obtained in this manner. Additionally, it will be possible in many instances to use the same pressurized fluid for both the blowing and cooling phases of the molding operation. The ability to separate and remove the neck mold half-sections 13a and 13b prior to completion of the cooling of the molded article is very significant in that the time required for completion of each cycle of the molding operation is materially reduced. Ordinarily the time required for cooling the blown article sufficiently to remove same from the mold exceeds by a substantial margin the time required to merely expand the article to the desired shape of the mold, and it has therefore been common practice heretofore to retain the molded article within the mold during practically the entire interval of time during which the molded article is being cooled. However, as described above, the separation and movement of the neck mold half-sections 13a and 13b upward around the body mold half-sections 12a and 12b frees the neck mold half-sections 13a and 13b for initiation of the next molding cycle while cooling of the preceding blown article is still taking place. Consequently, a substantial reduction in the time required for each complete cycle of the molding operation may be achieved and without a sacrifice in the cooling time.

After the molded article, such as the bottle 16, has been sufficiently cooled to attain self-supporting rigidity and to prevent adhesion between the article and the walls of the mold 12, the body mold half-sections 12a and 12b may be laterally separated by retraction of the piston rods 12c and 12d and the cooled molded article removed therefrom. Removal of the article, which is greatly facilitated by the aforementioned cooling step, may be accomplished manually or by other suitable means not illustrated.

During the cooling and removal of the molded article, the neck mold half-sections 13a and 13b are moved laterally inward by pistons 13c and 13d (FIG. 8) to enclose the next successive plastic formation 11 issuing from the discharge orifice 10a and mold the neck portion of the next successive bottle 16.

Alternatively, although not illustrated, it is understood that should it be desirable to fill the neck mold 13 with freshly extruded plastic immediately as the plastic leaves the discharge orifice 10a, the knife 15 may be moved across the discharge orifice to remove the plastic 11a therefrom just prior to moving the neck mold half-sections 13a and 13b inward into position under the discharge orifice. After the neck portion of the bottle 16 has thus been injection or compression molded the neck mold 13 is advanced away from the discharge orifice together with the tubular plastic formation preparatory to the molding of the body portion of the article. The separated body mold half-sections 12a and 12b may then be moved upward around the neck mold half-sections 13a and 13b by extending piston rods 12k and 12m and closed around the advancing tubular plastic formation in abutment with mold 13. Thereafter, the next molding cycle may be carried out in the same manner as previously described.

From the foregoing, it will be readily apparent that each of the mold half-sections, viz. 12a, 12b, 13a and 13b, move in closed circuitous paths disposed radially about the axis of the extruder orifice and coinciding along the axis of the extruder orifice; the paths of movement of the neck mold half-sections 13a and 13b and the paths of movement of the body mold half-sections 12a and 12b being in substantially perpendicular relationship. Thus, the molds 12 and 13 are enabled to concurrently perform different molding operations on successive articles by virtue of being able to move in a circuitous path out and around each other during the molding operations. Consequently, greater production efficiencies and economy can be realized.

The operational sequence described above is effected by a series of cams which relate and regulate the movements and operation of the various parts of the apparatus in timed sequence. As illustrated in FIG. 10, the cams 21b, 22b, 23b, 24b, 25b, 26b, 27b, 28b, and 29b are journalled on cam shaft 35 for rotation therewith. The cam shaft 35 is suitably carried at opposite ends in supported bearing 35a and 35b, and is driven by a motor 36 which transmits rotary motion to the shaft through a continuous belt 36a which is trained over pulleys (not shown) journalled respectively on the drive shaft 36b of the motor 36 and the cam shaft 35. More specifically, valves 21, 22, 23, 24, 25, 26, 27, 28 and 29 each have a plunger element, such as 21a, 22a, 23a, 24a, 25a, 26a, 27a, 28a, and 29a, respectively, which is operated, respectively, by the cams 21b, 22b, 23b, 24b, 25b, 26b, 27b, 28b, and 29b to control the admission of fluid pressure from fluid pressure supply lines 30 and 37 to conduits 21c, 22c, 23c, 24c, 25c, 26c, 27c, 28c, and 29c which carry fluid pressure from the individual valves to the various pistons and blow head 14. For example, depression of plunger 21a on valve 21 admits fluid pressure from fluid pressure supply line 30 into conduit 21c which in turn carries the fluid pressure to pistons 13e and 13f and extends the piston rods 13c and 13d, respectively, to close the neck mold half-sections 13a and 13b. In like manner, depression of plunger 25a on valve 25 operates to close body mold half-sections 12a and 12b. Depression of plungers 28a and 23a operate respectively to open molds 12 and 13, and depression of plungers 24a and 29a, respectively, raises the molds 12 and 13; whereas, depression of plungers 26a and 22a, respectively, lowers the molds 12 and 13. Blowing pressure and coolant admitted to blow head 14 is controlled by valve 27, which opens to admit blowing pressure and coolant, preferably air, to line 27c from supply line 37 when plunger 27a is depressed by cam 27b.

The sequence of operation is such that when the molds 12 and 13 are in the positions shown in FIG. 1, the valves 21, 23, 26, and 29 are open, and valves 22, 24, 25, 27, and 28 are closed, and cause the mold 13 to be in a closed and raised position, mold 12 to be in a lowered and open position, and the blow head 14 to direct a jet of pressurized fluid into the plastic bottle 16 to cool same. The rapid expansion of the pressurized fluid as it leaves the blow head 14 promotes such cooling. To advance the apparatus to the positions shown in FIG. 3, valve 21 is kept open, valve 29 is closed, valve 22 is opened, valve 24 is opened, and shortly thereafter, valves 23 and 24 are closed, and valves 25 and 26 are closed, and the knife is rapidly reciprocated across the extruder orifice 10a. Thereafter, valve 27 is opened to expand the plastic as shown in FIG. 4. Then, valve 21 is closed, and valve 28 opened to position the apparatus as in FIG. 6. Thereafter, valve 22 is closed, and valve 29 opened to position the apparatus as in FIG. 7. Then, valve 28 is closed, and valve 21 opened to position the apparatus as in FIG. 8. Shortly thereafter, valves 25 and 27 are closed, and valve 23 is opened to position the apparatus as in FIG. 2 to complete one cycle of the molding operation.

It will, of course, be understood that various details of construction and operation may be modified throughout a wide range of equivalents without departing from the principles of this invention, and it is not, therefore, the purpose to limit the patent granted hereon otherwise than as necessitated by the scope of the appended claims.

I claim:

1. The method of operating a plastic bottle blowing machine having a plastic tube extruder having an orifice surrounding a mandrel, a segmental neck mold, a segmental body mold, and a blow head, comprising the steps of positioning the segmental neck mold in closed position at the extruder orifice to surround the mandrel and filling the space intermediate the mandrel and the neck mold with plastic, moving the closed segmental neck mold in the direction of extrusion while extruding a plastic tube integral with the plastic in the neck mold, closing the segmental body mold about the extruded plastic tube and in abutment with the trailing face of the closed segmental neck mold, engaging the blow head with the leading face of the closed segmental neck mold, blowing air into the plastic tube through the plastic in the neck mold to conform to the cavity of said closed segmental body mold, removing surplus plastic lying between said body mold and said extruder orifice, opening said segmental neck mold, moving the neck mold segments around the closed body mold and reclosing the neck mold segments in abutment with the extruder orifice to initiate another molding cycle, opening the segmental body mold to release the formed bottle, and relatively moving the body mold segments around the closed segmental neck mold to repeat their cycle.

2. The method defined in claim 1, wherein each of said neck mold segments is moved in a closed rectangular path.

3. The method defined in claim 1, wherein each of said neck mold segments is moved in a closed rectangular path, and each of said body mold segments is moved in a closed rectangular path, the plane of movement of said neck mold segments being perpendicular to the plane of movement of said body mold segments.

4. The method defined in claim 1, wherein each of said neck mold segments and each of said body mold segments is moved in a closed path, the path of movement of said neck mold segments being in a different plane than the path of movement of said body mold segments.

5. The method defined in claim 1, wherein each of said neck mold segments is moved in a closed circuitous path, and each of said body mold segments is also moved in a closed circuitous path, the path of movement of said neck mold segments being in a different plane than the path of movement of said body mold segments but coinciding therewith along the axis of extrusion of said plastic material.

6. The method defined in claim 1, wherein each of said neck mold segments is moved in a closed circuitous path, and each of said body mold segments is also moved in a closed circuitous path, the path of movement of said neck mold segments being in a different plane than the path of movement of said body mold segments, and all of said planes being disposed radially from the axis of extrusion of said plastic material.

7. The method of forming hollow plastic bottles, which comprises the steps of extruding a heat-softened plastic material at a temperature sufficient to permit injection molding of said plastic material, injection molding the neck portion of each of said bottles by forcing said plastic material under the force of said extrusion into an annular space defined in a neck mold, extruding a length of said plastic material contiguous with the portion molded in said neck mold, blow-molding said contiguous length of plastic material within a body mold to form the body portion of each of said bottles, removing said neck mold from said molded material and molding the neck portion of another bottle on a succeeding portion of said extruded plastic material, cooling the plastic within said body mold while forming the neck portion of another bottle within said neck mold, removing the molded plastic bottle from said body mold, and thereafter molding the body portion of the bottle being molded in said neck mold.

8. The method of forming hollow plastic articles comprising the steps of: extruding a hollow tubular formation of heat-softened plastic material in endwise manner into a first mold having a walled mold cavity defined therein to receive said plastic material, injection molding the mold-entering end portion of said plastic to a predetermined annular configuration by compressing same between the wall of said mold cavity and a mandrel-like element axially insertable in said tubular plastic formation; continuing the extrusion of tubular plastic material and concurrently shifting the molded end portion of said plastic in the direction of extrusion to extrude a length of tubular plastic material integral with the molded end.

portion; enclosing said length of tubular plastic material in a walled mold cavity formed in a second mold; molding said length of plastic material by expanding same to the shape of the walled mold cavity formed in said second mold; withdrawing said first mold from said molded plastic material; cooling said molded plastic within said second mold while concurrently arranging said first mold in position to mold the next successive article; removing the cooled molded article from said second mold; and then completing the molding of the next successive article in said second mold.

9. The method of forming hollow plastic bottles comprising the steps of: extruding a hollow tubular formation of heat-softened plastic material in endwise manner into a walled mold cavity in a neck mold defining the neck portion of said bottle; comprising the mold-entering end portion of said plastic material between the wall of said mold cavity and a mandrel-like element axially insertable in said tubular plastic formation to form the neck portion of the bottle; continuing the extrusion of tubular plastic material and concurrently shifting the molded neck portion in the direction of extrusion to extrude a length of tubular plastic material integral with the molded neck portion; enclosing said length of tubular plastic material in a walled mold cavity in a body mold defining the body portion of said bottle; introducing blow air through the formed neck portion to expand said length of tubular plastic material to the shape of the walled mold cavity in said body mold; withdrawing said neck mold from the molded plastic material; cooling the expanded plastic within siad body mold while concurrently arranging said neck mold in position to mold the neck portion of the next successive article; removing the cooled molded bottle from said body mold; and then repeating the above steps relating to said body mold to mold the next successive bottle.

10. Apparatus for forming hollow plastic articles having an open neck, comprising: means for axially extruding a tubular configuration of heated thermoplastic material from an orifice; a pair of neck mold sections closable to form a cavity defining the neck of the article; a first means for moving each of said neck mold sections in parallelism with the axis of extrusion; a second means for moving each of said neck mold sections laterally with respect to the axis of extrusion; whereby said neck mold sections may be closed in juxtaposition with said orifice to be filled with plastic, then moved axially away from said orifice while closed to extrude a plastic tube, then opened by opposite radial movements to release the formed neck of the article, and then returned to said closed position in juxtaposition with said orifice; and a pair of body mold sections closable to form a cavity defining the body of the article; a third means for moving each of said body mold sections through a closed circuitous path in a plane disposed radially from the axis of extrusion, said plane being perpendicular to the plane of movement of said neck mold sections, whereby said body mold sections may be opened to permit said closed neck mold sections to pass therebetween and closed behind and in abutting contact with said neck mold sections to enclose the extruded plastic tube; and fluid pressure means located in spaced relation to said second orifice for injecting air through the formed neck to expand the enclosed plastic tube to conform to the cavity of said closed body mold sections.

11. Apparatus for molding hollow plastic articles, said apparatus comprising: an extruder defining an annular discharge orifice; means for forcing heat-softened plastic material through said discharge orifice to extrude a tubular plastic formation; a first mold having separable molding sections cooperating to define a mold cavity arranged to receive the tubular plastic formation extruded from said discharge orifice, each of said molding sections being mounted for alternating movements toward and away from each other and toward and away from said discharge orifice; means for moving the molding sections of said first mold together to mold the oncoming end portion of said plastic material; means for moving said molding sections away from said discharge orifice at substantially the same rate as the extrusion of said tubular formation, to thereby form a length of tubular plastic extending between said first mold and said discharge orifice; a second mold also having separable molding sections cooperating to define a molding cavity and mounted for movements toward and away from each other and toward and away from said discharge orifice; means for moving the molding sections of said second mold together to enclose said length of tubular plastic and in contact with the trailing end of said first mold; means for severing said length of tubular plastic between said second mold and said discharge orifice; means for introducing air through the first mold into the length of tubular plastic enclosed in the second mold to conform same to the contour of the molding cavity formed in said second mold; means for moving the molding sections of said first mold away from each other and around said second mold toward said discharge orifice to mold the next successive article; means for moving the molding sections of said second mold away from each other to remove the molded article therefrom while said first mold is commencing the molding cycle on the next successive article; and means for moving the molding sections of said second mold around said first mold while said first mold is advancing from said discharge orifice with a length of tubular plastic material for the next successive article.

12. Apparatus for molding hollow plastic articles, said apparatus comprising: an extruder defining an annular discharge orifice; means for forcing heat-softened plastic material through said discharge orifice to extrude a tubular plastic formation; a first mold having separable molding sections cooperating to define a mold cavity arranged to receive the tubular plastic formation extruded from said discharge orifice, said molding sections being mounted for opening and closing movement and movements toward and away from said discharge orifice; means for closing the molding sections of said first mold to engage and mold the oncoming end portion of the extruded plastic material; means for moving said molding sections axially from said discharge orifice at substantially the same rate as the extrusion of said tubular formation, to thereby form a length of tubular plastic extending between said first mold and said discharge orifice; a second mold positioned in the path of movement of said first mold having separable molding sections cooperating to define a molding cavity; means for moving the molding sections of said second mold and said first mold past each other while said first mold remains closed around said plastic; means for closing the molding sections of said second mold around said length of tubular plastic and in abutment with the trailing end of said first mold; means for severing said length of tubular plastic between said second mold and said discharge orifice; means insertable into the first mold for expanding said length of tubular plastic to conform to the contour of the molding cavity formed in said second mold; means for opening the molding sections of said first mold and moving same toward said discharge orifice while said second mold remains closed; and means for opening the molding sections of said second mold to remove the molded article therefrom while said first mold is commencing the molding cycle on the next successive article.

13. The combination of a neck mold comprising separable sections formed to define a neck mold cavity, means axially insertable in said neck mold cavity and in spaced relationship with the side walls of said mold cavity to define an annular molding space within said neck mold, means for extruding a tubular plastic formation in endwise manner into said annular space under a positive pressure sufficient to force same to mold to the shape of said annular space, means for moving said neck mold away from said extruding means in the direction of extrusion and at substantially the same rate as the rate at which the plastic material is being extruded to thereby form a length of tubular plastic contiguous with the annular molded end portion of said plastic and extending between said neck mold and said extruding means, a body mold having separable sections defining a mold cavity, means for closing the sections of said body mold around said length of tubular plastic material and in abutting relationship with said neck mold cavity, said neck mold also defining an axial passageway communicating with said neck mold cavity, means for introducing a pressurized fluid through said passageway to thereby expand the plastic material within said body mold to the shape of said body mold cavity, means for severing the expanded plastic material from said extruding means, means for withdrawing said neck mold sections from the plastic material and moving same toward said extruding means while said body mold sections remain closed around said expanded plastic material, means for introducing a coolant into the annular portion of the plastic molded by said neck mold sections to thereby cool the interior of the molded plastic, means for separating said body mold sections to remove the molded plastic therefrom.

14. Apparatus for molding hollow plastic articles, said apparatus comprising a pair of complementary molds respectively having molding sections cooperating to define an interconnected mold cavity defining said article, means for extruding a tubular formation of plastic material, each of the molding sections of said molds being mounted for movements in a closed path in a plane disposed radially with respect to the axis of extrusion of said plastic material and coinciding along the axis of extrusion, means for moving the molding sections of each respective mold as a unit around each other in alternate sequence by moving said molding sections through said closed paths of movement to thereby alternately reverse the relative positions of said molds with respect to said extruding means and to alternately enclose successive portions of the extruded plastic material, means insertable into one of said molds for forcing the mold enclosed plastic material to conform to the shape of the mold cavity, and means for severing said plastic material between the molded portion and said extruding means.

15. Apparatus for forming hollow plastic articles, said apparatus comprising the combination of: a pair of molds respectively having molding sections cooperating to define a mold cavity; means for opening and closing the molding sections of each of said molds; extrusion means for extruding a tubular formation of heat-softened plastic material; means for moving said molds toward and away from said extrusion means; severing means mounted for movements transversely across the axis of extrusion at a location intermediate said extrusion means and said molds for severing the tubular plastic material; a blow head insertable into one of said molds, means for introducing air through said blow head for expanding the tubular plastic material in the other of said molds; motion relating means for relating the individual movements of said molds in such sequence that one of said molds is closed around the extruded tubular plastic material and moved away from said extrusion means to form a length of tubular plastic material therebetween, the other mold is closed around said length of tubular plastic material and moved away from said extrusion means in abutment with the first-mentioned mold, the tubular plastic material is expanded to conform to the shape of said mold cavities, said tubular plastic formation is severed, one of said molds is opened and moved toward the extrusion means and closed around a succeeding portion of the tubular plastic material while the other mold is maintained closed, the last-mentioned mold opened to remove the molded article and moved toward the extrusion means and closed about another succeeding portion of the tubular plastic material to repeat the sequence of movements.

16. In a method of making a plastic bottle, the steps of continuously extruding through an orifice a tube of heat-softened thermo-plastic material, molding the leading end of said tube within a neck mold to mold an annular neck portion of the bottle, moving the neck mold and the neck portion confined thereby vertically in the direction of extrusion intermediate the open sections of a body mold while extruding a tubular extension integral with the confined neck portion, closing the body mold sections on the tubular extension to pinch shut the tubular extension in spaced relation to the neck portion, the leading end of the body mold contacting the trailing end of the neck mold, severing the tube intermediate the orifice and the body mold, concurrently shifting the closed body mold and the neck mold away from the orifice while maintaining contact therebetween to space apart the severed ends of the tube, introducing fluid under pressure through the neck mold into the tubular extension to blow the same against the walls of the body mold sections, opening the body mold sections and the neck mold to remove the blown bottle, removing the plastic material attached to the orifice for the formation of the next subsequent bottle.

17. In a method of making a plastic article having an injection molded portion and a blow molded portion, the steps of continuously extruding a tube of heat-softened thermo-plastic material through an orifice and about a central mandrel, positioning an injection mold at the orifice to surround a portion of the tube and the mandrel to injection mold a first tube portion to the final configuration of a first portion of the article and the mandrel, moving the injection mold from the orifice while extruding a second tube portion contiguous with the first portion thereof, enclosing the second tube portion in a blow mold, severing said second tube portion from the extruding tubing, concurrently moving said injection mold and said blow mold away from the orifice to space apart the severed ends of the tube and thereafter performing the steps of removing the injection mold from the first article portion, blowing the enclosed second tube portion of the article, removing the blow mold from the second article portion, and repositioning the injection mold at the orifice for cooperation with the mandrel to injection mold a first tubing portion of the next successive article, said last named four steps being performed in any sequence in which the step of opening of the injection mold precedes the step of repositioning thereof and in which the step of blowing precedes the step of opening the blow mold.

18. In a method of making a blown plastic article from an axially elongated tube continuously extruded from an orifice for enclosure within a separable blow mold, the improvements of extruding through an orifice an initial tube portion into an injection mold positioned at the orifice to form a finished injection molded portion of the article, moving the injection mold and the tube portion therein from the orifice in the direction of extrusion and at a rate at least equal to the rate of tubing extrusion to a blowing position, enclosing that portion of the tube intermediate the injection mold and the orifice in the blow mold, severing the tube intermediate the blow mold and the orifice, concurrently moving the blow mold and injection mold away from the orifice to space apart the severed ends of the tube, inserting a blow nozzle in the injection mold in alignment with the injection molded portion and blowing the portion of the tube enclosed by the blow mold to final configuration by the introduction of fluid under pressure through the finished injection molded portion of the article.

19. In a method of making a composite plastic article having separately molded portions from a tube of heat-softened plastic material continuously extruded from an orifice, the steps of (1) enclosing material extruded from said orifice in a first mold having separable sections co-operably defining a first portion of the article, (2) moving the first mold and the enclosed material in the direction of extrusion while continuing the extrusion of additional material exterior to the first mold, (3) enclosing in a second separable mold a portion of said additional material intermediate said orifice and said first molds, said second mold defining a second portion of said article and the first and second molds abutting one another, (4) moving the second mold and the enclosed additional material in the direction of extrusion while continuing the extrusion of further material exterior to both said first and said second molds, (5) separating the sections of said first mold at a location spaced from the orifice to expose the contents thereof, (6) returning the separated sections of said first mold counter to the direction of extrusion and about the closed second mold to a position adjacent the orifice, (7) repeating steps (1) and (2) above, (8) separating the sections of the second mold at said location spaced from the orifice to expose the contents thereof, (9) returning the separated sections of the second mold counter to the direction of extrusion and about the closed first mold to a position adjacent the orifice, and repeating the cycle of steps (3) through (9).

References Cited in the file of this patent

UNITED STATES PATENTS

| | | |
|---|---|---|
| 1,671,079 | McManus | May 22, 1928 |
| 2,579,399 | Ruekberg | Dec. 18, 1951 |
| 2,792,591 | Cardot et al. | May 21, 1957 |
| 2,804,654 | Sherman | Sept. 3, 1957 |

FOREIGN PATENTS

| | | |
|---|---|---|
| 209,682 | Australia | Dec. 20, 1956 |
| 1,105,529 | France | July 6, 1955 |
| 747,434 | Great Britain | Apr. 4, 1956 |
| 758,299 | Great Britain | Oct. 3, 1956 |